(12) United States Patent
Marconi

(10) Patent No.: US 7,986,052 B2
(45) Date of Patent: Jul. 26, 2011

(54) POWER GENERATION SYSTEM FOR AN AIRCRAFT USING A FUEL CELL

(75) Inventor: Patrick Marconi, Gelos (FR)

(73) Assignee: Turbomeca, Bordes (FR)

( * ) Notice: Subject to any disclaimer, the term of this patent is extended or adjusted under 35 U.S.C. 154(b) by 141 days.

(21) Appl. No.: 12/306,575

(22) PCT Filed: Jun. 26, 2007

(86) PCT No.: PCT/FR2007/051528
§ 371 (c)(1),
(2), (4) Date: Dec. 24, 2008

(87) PCT Pub. No.: WO2008/001006
PCT Pub. Date: Jan. 3, 2008

(65) Prior Publication Data
US 2009/0309364 A1   Dec. 17, 2009

(30) Foreign Application Priority Data
Jun. 27, 2006   (FR) ...................................... 06 52660

(51) Int. Cl.
*F02B 63/04* (2006.01)
(52) U.S. Cl. ................. 290/1 A; 290/52; 290/2; 60/608; 180/165
(58) Field of Classification Search .................. 290/1 A, 290/52, 2; 60/608; 180/165
See application file for complete search history.

(56) References Cited

U.S. PATENT DOCUMENTS

| 4,150,684 A * | 4/1979 | Kervin ........................... 137/111 |
| 4,490,622 A * | 12/1984 | Osborn ............................ 290/52 |
| 6,296,957 B1 | 10/2001 | Graage |
| 6,641,084 B1 | 11/2003 | Huber et al. |
| 6,658,873 B2 * | 12/2003 | Clarke et al. .................... 62/172 |
| 2004/0219408 A1 | 11/2004 | Hesse |

FOREIGN PATENT DOCUMENTS

| CA | 2 427 448 | 12/2003 |
| EP | 0 957 026 | 11/1999 |
| WO | 02 056401 | 7/2002 |

\* cited by examiner

*Primary Examiner* — T C Patel
*Assistant Examiner* — Iraj A Mohandesi
(74) *Attorney, Agent, or Firm* — Oblon, Spivak, McClelland, Maier & Neustadt, L.L.P.

(57) ABSTRACT

A fuel cell (10) has a compressed air inlet fed by a compressor (20) and a fuel inlet, and it produces direct current electricity. A turbine (30) receives a flow of gas under pressure from the fuel cell and is mechanically coupled to the first compressor in order to drive it. A second compressor (46) of a circuit for use in flight to feed pressurized air to the aircraft cabin (40) is mechanically coupled to a shaft of the turbine. An electric machine (50) may be coupled to the same turbine shaft as drives the compressor (46), the electric machine being capable of operating as a generator or as an electric motor.

12 Claims, 2 Drawing Sheets

POWER GENERATION SYSTEM FOR AN AIRCRAFT USING A FUEL CELL

BACKGROUND OF THE INVENTION

The invention relates to a power generator system for aircraft, and more particularly for an airplane, the system using a fuel cell.

In an airplane, the electricity needed for in-flight operation of the various pieces of electrical equipment is commonly supplied by one or more generators associated with engines of the airplane. With gas turbine engines, it is known to use starter/generators (S/Gs) for this purpose. They are mechanically coupled to a shaft of the turbine via a gearbox and they operate either as an electricity generator while in flight or else as an electric motor for starting. An auxiliary power unit (APU) supplies electricity, in particular on the ground, when the airplane engines are not running. Commonly an APU comprises a gas turbine driving a generator.

Since electricity is becoming ever more preferred over hydraulic power for actuating equipments of airplanes and of their motors, there is a need for producing ever increasing amounts of electricity on board airplanes.

To satisfy this increasing need without increasing the number and the power of generators such as S/Gs, proposals have been made to use a fuel cell in an APU. Reference can be made to document CA 2 427 448 which describes an electricity production system including a solid oxide fuel cell (SOFC). The cell receives a hydrocarbon fuel and compressed air coming from a compressor, and it produces direct current (DC) electricity together with a flow of hot gas under pressure. A turbine is fed with the gas flow and drives the compressor.

The assembly comprising the SOFC, the turbine, and the compressor operates in a manner similar to a conventional combustion gas turbine, with the SOFC taking the place of the combustion chamber, while also producing electricity without any polluting emission of nitrogen oxides (NOx).

OBJECT AND SUMMARY OF THE INVENTION

The invention proposes a power generator system for an aircraft that makes it possible to use the resources of a fuel cell beyond mere direct production of electricity, such a system comprising:
 a first compressor;
 a fuel cell having a compressed air inlet connected to the first compressor and a fuel inlet, and producing direct current electricity;
 a turbine receiving a flow of gas under pressure from the fuel cell and mechanically coupled to the first compressor in order to drive it; and
 a second compressor of a circuit for use in flight to feed the aircraft cabin with pressurized air, the second compressor for feeding the cabin being mechanically coupled to a shaft of the turbine.

The use of an APU with a conventional gas turbine for driving a compressor that causes air to circulate in an aircraft cabin is known, but only when the aircraft is on the ground, the APU not being sufficiently powerful to pressurize the cabin at cruising altitude. It is indeed possible to imagine dimensioning a conventional APU sufficiently for this purpose, but that would lead to an energy budget that is disadvantageous overall, which is why a compressor for feeding the cabin with pressurized air while in flight is conventionally driven by an electric motor powered by the electricity network of the airplane.

The use of a fuel cell increases energy efficiency and makes it possible, while in flight, for the compressor of the circuit for feeding the cabin with air to be driven by being mechanically coupled with a shaft of the turbine of the power generator system, without that being penalizing compared with using an electric motor powered by the electricity network of the airplane. It is thus possible to omit a dedicated electric motor together with its power supply for driving the compressor.

In an embodiment, the first compressor and the second compressor are driven by a common turbine shaft.

In another embodiment, the turbine has a first turbine stage receiving the flow of gas under pressure from the fuel cell and driving a first turbine shaft, and a second turbine stage receiving a flow of gas under pressure from the first turbine stage and driving a second turbine shaft, the first compressor being driven by the first turbine shaft while the second compressor is driven by the second shaft. This produces a configuration similar to that of a conventional combustion gas turbine with a high pressure turbine shaft and a low pressure turbine shaft.

It is also possible to provide an electric machine mounted in common with the second compressor on the same turbine shaft.

The electric machine may have a first mode of operation as an electricity generator and a second mode of operation as an electric motor, and a regulator circuit may be provided for switching the operation of the electric machine between the first mode and the second mode in order to maintain the mechanical torque available on the turbine shaft on which the electric machine is mounted to not less than a determined minimum value, or in order to servo-control the speed of rotation of the electric machine on a predetermined setpoint value.

BRIEF DESCRIPTION OF THE DRAWING

The invention can be better understood on reading the following description made with reference to the accompanying drawing, in which.

DETAILED DESCRIPTION OF EMBODIMENTS

Figure 1:
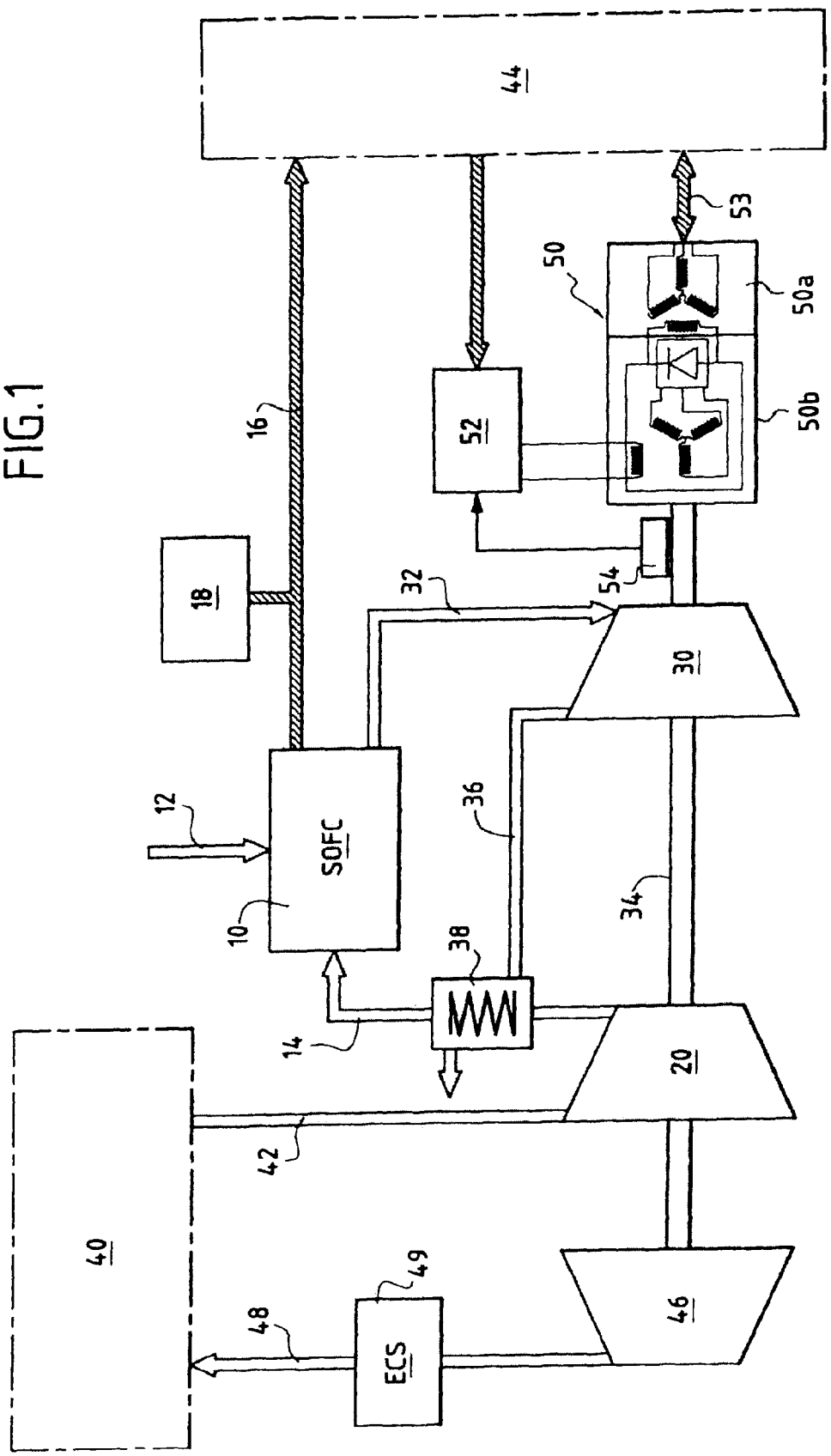
FIG. 1 is a highly diagrammatic view of an embodiment of a power generator system in accordance with the invention.

The system for generating power in an airplane as shown in FIG. 1 comprises a fuel cell 10, such as a solid oxide fuel cell (SOFC) made up of a plurality of cells disposed side by side and connected in series. The fuel cell 10 is powered with hydrocarbon fuel and with compressed air, the oxygen from the compressed air reacting with the hydrogen of the fuel to produce electricity. The way such an SOFC is made and how it is operated are well known and not described in detail.

The fuel that is taken from a tank (not shown) by a pipe 12 may be methane ($CH_4$). It should be observed that it is known to use other hydrocarbons, including kerosene, as fuel in an SOFC, so the SOFC 10 could be powered from a tank containing fuel for the airplane engines.

The compressed air is delivered via a pipe 14 from a compressor 20. The air feeding the compressor 20 may be air that has passed through the airplane cabin 40 and that has been delivered to the compressor by a pipe 42.

The SOFC 10 produces electricity in the form of direct current that is available on a line 16. The line 16 is connected to an electricity network 44 of the airplane. A battery 18 is also connected to the line 16 to store any unused electricity and to smooth out any transient electrical variations that might be of large amplitude, e.g. due to breaking a circuit, making a connection, or suddenly starting or stopping a piece of electrical equipment. The electricity network 44 of the airplane is also fed in conventional manner by generators such as S/Gs driven by the engines of the airplane.

The compressed hot gas from the SOFC 10 and essentially containing carbon dioxide $CO_2$ and water vapor $H_2O$ is taken to a turbine 30 by a pipe 32. The turbine 30 is driven in rotation by the compressed hot gas and is mechanically coupled to the compressor 20, the rotors of the turbine 30 and of the compressor 20 being mounted on a common shaft 34 of the turbine.

The gas coming from the turbine 30 is exhausted via a pipe 36. A heat exchanger 38 has two separate gas circuits connected in series respectively with the pipe 14 and with the pipe 36. The heat exchanger 38 uses the residual heat energy of the gas from the turbine to heat the compressed air fed to the SOFC 10.

The turbine 30 also drives a second compressor 46 forming part of a circuit for feeding the cabin 40 with air. The compressor 46 is fed with outside air, which it compresses in order to feed it to the cabin 40 via a pipe 48 through a system 49 that serves to adjust the temperature and the pressure of the air, known as an environmental control system (ECS), and well known in itself.

In the embodiment of FIG. 1, the compressor 46 is mounted on the shaft 34 of the turbine 30.

The turbine 30 is also mechanically coupled to an electric machine 50 having a rotor mounted on the shaft 34. Other mechanical loads could optionally be coupled to the turbine 30.

The electric machine 50 may operate in an electricity generator mode or in an electric motor mode. The machine 50 may be made as an S/G machine comprising firstly a synchronous generator 50a with a main rotor having a primary circuit and main stator having a secondary circuit, and secondly an exciter 50b having a stator with a primary circuit and a rotor with a secondary circuit, the secondary circuit of the exciter being connected to the primary circuit of the synchronous generator via a rectifier formed by a rotary diode bridge.

The mode of operation of the electric machine 50 is controlled by a regulator circuit 52, the electric machine operating as an electricity generator when the torque or the mechanical power delivered by the turbine exceeds the needs of the compressors 20 and 46 plus any other loads that might be present, and the electric machine 50 operating as an electric motor for assisting the turbine in order to deliver the minimum mechanical power or torque required for the needs of the compressors 20 and 46 and any other loads that might be present.

In the generator mode of operation, the circuit 52 feeds the primary circuit of the exciter 50b with alternating current (AC) delivered by the electricity network 44, and the alternating voltage delivered by the synchronous generator 50a is injected into the electricity network 44 of the airplane via a line 53.

In motor operation mode, the circuit 52 feeds the primary circuit of the exciter 50b with DC, while the secondary circuit of the generator 50a is fed with AC by the line 53 from the network. The DC needed for feeding the primary circuit of the exciter may be taken from the network 44, possibly via a rectifier, or it may be taken from the output of the SOFC 10 or from the battery 18.

The regulator circuit 52 controls the operating mode of the machine 50 so as to maintain the level of torque available at the outlet from the turbine at not less than a determined minimum value. For this purpose, the regulator circuit 52 receives a signal delivered by a sensor 54 and representative of the outlet torque from the turbine, e.g. a signal representative of the speed of rotation of the shaft 34. The power of the electric machine can be controlled by servo-controlling the value of its speed of rotation and thus the speed of rotation of the pressurization compressor 46 to a predetermined setpoint value.

Figure 2:
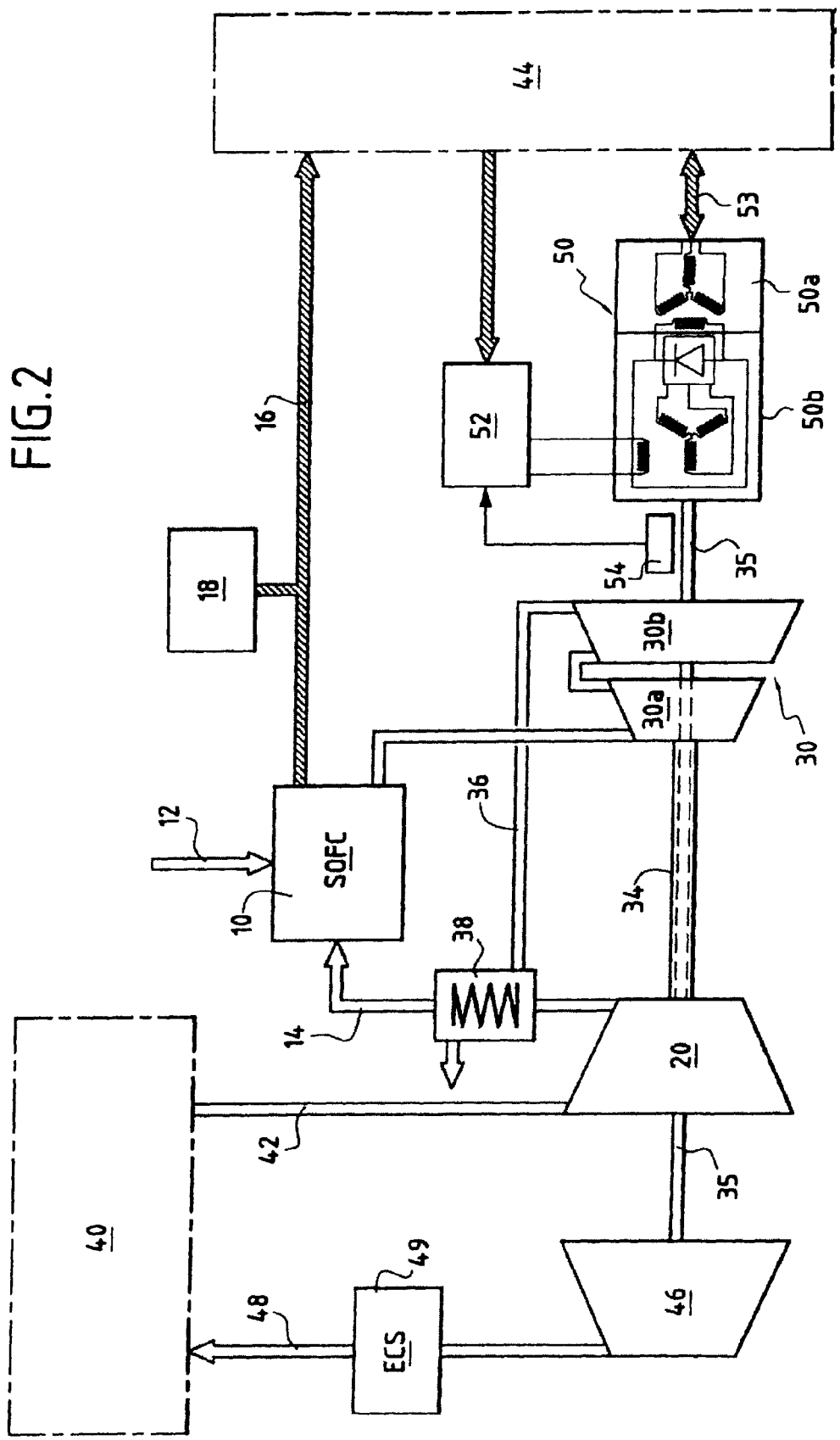
FIG. 2 is a highly diagrammatic view of a variant embodiment of the power generator system of FIG. 1.

FIG. 2 shows a variant embodiment that differs from that of FIG. 1 in that the turbine 30 comprises a first turbine stage 30a driving the shaft 34 and a second turbine stage 30b fed with the gas flow coming from the first stage 30a and driving a shaft 35, the second compressor 46 and the electric machine being mounted on the shaft 35. The heat exchanger 38 receives the gas stream coming from the second stage (30b) of the turbine, prior to exhausting it. The shafts 34 and 35 are coaxial, the shaft 35 being driven at a speed of rotation that is slower than that of the shaft 34. This is a configuration analogous to that used by the high pressure and low pressure shafts of a conventional combustion gas turbine.

Since the machine 50 is mounted on the same shaft 35 as the compressor 46, it makes it possible, where appropriate, to make up for a lack of driving power from the turbine stage 30b. The speed sensor 54 is associated with the shaft 35. As above, the power of the electric machine can be controlled by the regulator circuit 52 by servo-controlling the value of its speed of rotation and thus the speed of rotation of the pressurization compressor 46 to a predetermined setpoint value.

The invention claimed is:

1. A power generator system for an aircraft, the system comprising:
   a first compressor having an air inlet and a compressed air outlet;
   an electricity generating device including a fuel cell having a compressed air inlet connected to the outlet of the first compressor and a fuel inlet, and producing direct current electricity on a power line connected to the fuel cell through reaction of the oxygen from the compressed air with the fuel;
   a turbine receiving a flow of gas under pressure from the fuel cell and mechanically coupled to the first compressor; and
   a second compressor of a circuit for use in flight to feed the aircraft cabin with pressurized air;
   the second compressor for feeding the cabin being mechanically coupled to a shaft of the turbine.

2. A system according to claim 1, wherein the first compressor and the second compressor are mounted on a common turbine shaft.

3. A power generator system for an aircraft, the system comprising:
   a first compressor;
   a fuel cell having a compressed air inlet connected to the outlet of the first compressor and a fuel inlet, and producing direct current electricity;
   a turbine receiving a flow of gas under pressure from the fuel cell and mechanically coupled to the first compressor; and
   a second compressor of a circuit for use in flight to feed the aircraft cabin with pressurized air;
   the second compressor for feeding the cabin being mechanically coupled to a shaft of the turbine,
   wherein the turbine comprises a first turbine stage receiving the flow of gas under pressure from the fuel cell and driving a first turbine shaft, and a second turbine stage receiving a flow of gas from the first turbine stage and driving a second turbine shaft, the first compressor being driven by the first turbine shaft, while the second compressor is driven by the second shaft.

4. A system according to claim 1, further comprising an electric machine mechanically coupled to a shaft of the turbine.

5. A system according to claim 4, wherein the electric machine and the second compressor are mounted in common on the same turbine shaft.

6. A system according to claim 4, wherein the electric machine has a first mode of operation as an electricity generator and a second mode of operation as an electric motor, and a regulator circuit is provided for switching the operation of the electric machine between the first and second modes in order to maintain the mechanical torque available on the turbine shaft on which the electric machine is mounted to a value that is not less than a determined minimum value.

7. A system according to claim 4, wherein a regulator system is provided for servo-controlling the speed of rotation of the electric machine to a predetermined setpoint value.

8. A system according to claim 1, further including a heat exchanger separately passing the compressed air feeding the fuel cell and a gas flow leaving the turbine so as to heat the compressed air produced by the compressor prior to admitting said compressed air into the fuel cell.

9. A power generator system for an aircraft, the system comprising:
 a first compressor having an air inlet and a compressed air outlet;
 a fuel cell having a compressed air inlet connected to the outlet of the first compressor, a fuel inlet and a gas outlet and producing direct current electricity;
 a turbine receiving a flow of gas under pressure from the fuel cell and mechanically coupled to the first compressor in order to drive it;
 a second compressor of a circuit for use in flight to feed the aircraft cabin with pressurized air, the second compressor for feeding the cabin being mechanically coupled to a shaft of the turbine;
 an electric machine mechanically coupled to a shaft of the turbine and having a first mode of operation as an electricity generator and a second mode of operation as an electric motor; and
 a regulator circuit for switching the operation of the electric machine between the first and second modes in order to maintain the mechanical torque available on the turbine shaft on which the electric machine is mounted to a value that is not less than a determined minimum value.

10. A system according to claim 9, wherein the first compressor, the second compressor and the electric machine are mounted on a common turbine shaft.

11. A system according to claim 9, wherein the turbine comprises a first turbine stage receiving the flow of gas under pressure from the fuel cell and driving a first turbine shaft, and a second turbine stage receiving a flow of gas from the first turbine stage and driving a second turbine shaft, the first compressor being driven by the first turbine shaft, while the second compressor and the electric machine are driven by the second turbine shaft.

12. A system according to claim 9, wherein a regulator system is provided for servo-controlling the speed of rotation of the electric machine to a predetermined set point value.

* * * * *